United States Patent [19]

Ervin

[11] Patent Number: 5,070,741

[45] Date of Patent: Dec. 10, 1991

[54] LARGE COLLAPSE MINI-STEERING COLUMN

[75] Inventor: Paul R. Ervin, Dearborn, Mich.

[73] Assignee: Ford Motor Company, Dearborn, Mich.

[21] Appl. No.: 633,632

[22] Filed: Dec. 21, 1990

[51] Int. Cl.$^5$ .......................... B62D 1/18; F16F 7/12
[52] U.S. Cl. ............................................ 74/492; 74/493;
74/498; 280/775; 280/777; 188/375
[58] Field of Search ...................... 74/492, 498, 493;
280/775, 777; 188/371, 375

[56] References Cited

U.S. PATENT DOCUMENTS

| | | | |
|---|---|---|---|
| 1,144,307 | 6/1915 | Moore et al. | 74/498 X |
| 1,265,563 | 5/1918 | West | 74/498 |
| 2,142,266 | 1/1939 | Drachenberg et al. | 74/498 X |
| 2,836,078 | 6/1956 | Yonkers | 74/493 |
| 3,011,823 | 12/1961 | Maher | 280/777 X |
| 3,394,612 | 9/1966 | Bogosoff | 74/492 |
| 3,457,800 | 10/1967 | Toshida | 74/492 |
| 3,472,093 | 11/1967 | Tenniswood | 74/492 |
| 3,477,307 | 12/1967 | Maddox | 74/492 |
| 3,479,080 | 3/1967 | Hilfiker | 296/35 |
| 3,480,291 | 3/1967 | Hilfiker | 280/87 |
| 3,492,888 | 2/1970 | Nishimura et al. | 280/777 X |
| 3,538,785 | 11/1970 | Grancon | 74/492 |
| 3,543,538 | 12/1970 | Farrell | 64/13 |
| 3,600,971 | 7/1971 | Scarvelis et al. | 74/492 |
| 3,653,468 | 4/1972 | Marshall | 188/375 |
| 3,656,366 | 4/1972 | Somero | 74/492 |
| 3,670,591 | 6/1972 | Milton | 74/492 |
| 3,752,007 | 8/1973 | Blondeleau et al. | 74/492 |
| 3,756,340 | 9/1973 | Millard | 74/498 X |
| 3,823,617 | 7/1974 | Infanger et al. | 74/498 |
| 3,877,319 | 4/1975 | Cooper | 74/492 |
| 3,934,486 | 1/1976 | Becker et al. | 74/492 |
| 3,983,763 | 10/1976 | Adams | 74/498 X |
| 4,156,372 | 5/1979 | Wenninger | 74/492 |
| 4,183,258 | 1/1980 | Stephan | 74/492 |
| 4,195,535 | 4/1980 | Brouckson | 74/493 |
| 4,411,167 | 10/1983 | Mohr | 188/371 X |
| 4,602,520 | 7/1986 | Nishikawa et al. | 74/493 |
| 4,718,296 | 1/1988 | Hyodo | 74/492 |
| 4,730,508 | 3/1988 | Haldric et al. | 74/492 |
| 4,823,923 | 4/1989 | Moyer | 188/375 X |

FOREIGN PATENT DOCUMENTS

| | | | |
|---|---|---|---|
| 1552965 | 12/1968 | France | 280/777 |
| 62-46764 | 2/1987 | Japan | 74/492 |

Primary Examiner—Allan D. Herrmann
Assistant Examiner—Julie Krolikowski
Attorney, Agent, or Firm—Raymond L. Coppiellie; Clifford L. Sadler

[57] ABSTRACT

A collapsible steering column arrangement for a vehicle is disclosed which comprises a pair of offset shafts and an extrudable housing. One of the shafts is generally fixed with respect to the vehicle and includes a first gear, a second gear and the other shaft includes in rotational driving engagement with the first gear on the one shaft for steering the vehicle and is movable with respect to the one shaft in response to an axial load imposed on the steering column arrangement. The energy of the axial load is absorbed when the second gear extrudes through the housing. In an alternative embodiment, one of the shafts includes a first gear and the other shaft includes a second gear in rotational driving engagement with the first gear to transfer rotation between the shafts, one of the gears having teeth with a width greater than the teeth of the other gear to allow the length of the steering column to be adjusted according to the driver's preference.

14 Claims, 3 Drawing Sheets

LARGE COLLAPSE MINI-STEERING COLUMN

TECHNICAL FIELD

This invention relates to collapsible steering columns for vehicles, and in particular to such columns having offset shafts which move relative to each other when an axial load is imposed and absorb energy through the extrusion of metal.

BACKGROUND ART

Steering columns are known which collapse to absorb the energy of an axial load imposed on the steering column in the event of a vehicle front end collision. Conventionally, these steering columns dissipate energy through the bending or straightening of metal. For instance, deformable metal brackets used to mount the steering column within the vehicle help absorb energy.

A problem with the use of metal mounting brackets is that they are heavy, and thus add undesirable weight to the vehicle. Furthermore, metal mounting brackets are cumbersome to work with, and constitute one more component which may intrude into the occupant compartment of the vehicle if the front end of the vehicle is driven back during the collision.

As an alternative to heavy mounting brackets, several designs have been proposed in which energy is absorbed through friction between concentric sections of a telescoping steering shaft during collapse. For example, U.S. Pat. No. 3,394,612 to Bogosoff et al, issued July 30, 1968, and U.S. Pat. No. 3,877,319 to Cooper, issued Apr. 15, 1975, both disclose a telescoping steering shaft in which energy is absorbed by the deformation of adjacent concentric sections of the steering column.

Telescoping designs, however, generally have a stroke distance which is limited because the concentric shafts must overlap each other for stability during normal operation. An offset design, in which the steering column has two or more shafts which are joined by a breakaway coupling, requires less of an overlap. Therefore, an offset design can maintain a stroke distance equal to a telescoping design, while shortening the overall length of the steering column. As a result of a shortened steering column, the vehicle dash may intrude further into the occupant compartment without contacting or moving the steering column. Presently, however, many offset designs do not employ any means of energy absorption beyond the point where the coupling between the shafts is broken. In alternative designs such as U.S. Pat. No. 4,718,296 to Hyodo, issued Jan. 12, 1988, the energy absorbed by the steering column decreases as the shafts are displaced relative to each other.

SUMMARY OF THE INVENTION

It would be desirable to have a steering column arrangement which combines an offset steering shaft design with a method of constant energy absorption throughout the displacement of the offset shafts. Therefore, the present invention provides a novel steering column arrangement which is collapsible to absorb the energy of an axial load imposed on the steering column arrangement which is generated in a front-end collision. The steering column arrangement comprises a pair of offset shafts, one of which is generally fixed with respect to the vehicle while the axial load is imposed, and the other of which includes drive means in rotational driving engagement with the one shaft for steering the vehicle and is moveable with respect to the one shaft in response to the imposition of the axial load. The steering column arrangement also comprises a housing which at least partially surrounds the other shaft, one end of the housing being generally fixed with respect to the one shaft, and the other end of the housing being engaged and extruded by the drive means when the drive means moves. The energy of the axial load is absorbed when the drive means extrudes through the housing.

Accordingly, it is an object of the invention to provide an improved collapsible steering column with a pair of offset shafts, one of the shafts including a first gear and the other shaft including a second gear in rotational driving engagement with the first gear to transfer rotation between the shafts, the second gear extruding through a housing to absorb the energy of an axial load imposed on the steering column.

Another object of the invention is to provide a collapsible steering column with a pair of offset shafts, one of the shafts including a first gear and the other shaft including a second gear in rotational driving engagement with the first gear to transfer rotation between the shafts, the second gear extruding through a housing to absorb the energy of an axial load imposed on the steering column, one of the gears having teeth with a width greater than the width of the teeth of the other gear to allow the length of the steering column to be adjusted according to the driver's preference.

Another object of the invention is to provide a collapsible steering column with a pair of offset shafts, one of the shafts including a first gear and the other shaft including a second gear in rotational driving engagement with the first gear to transfer rotation between the shafts, the second gear extruding through a housing to absorb the energy of an axial load imposed on the steering column, the steering column being shorter than conventional telescoping steering columns to allow greater dash intrusion without moving the steering column.

These and other objects, features and advantages of the present invention will be more apparent from the following description and drawings.

BEST MODE FOR CARRYING OUT THE INVENTION

Figure 1:
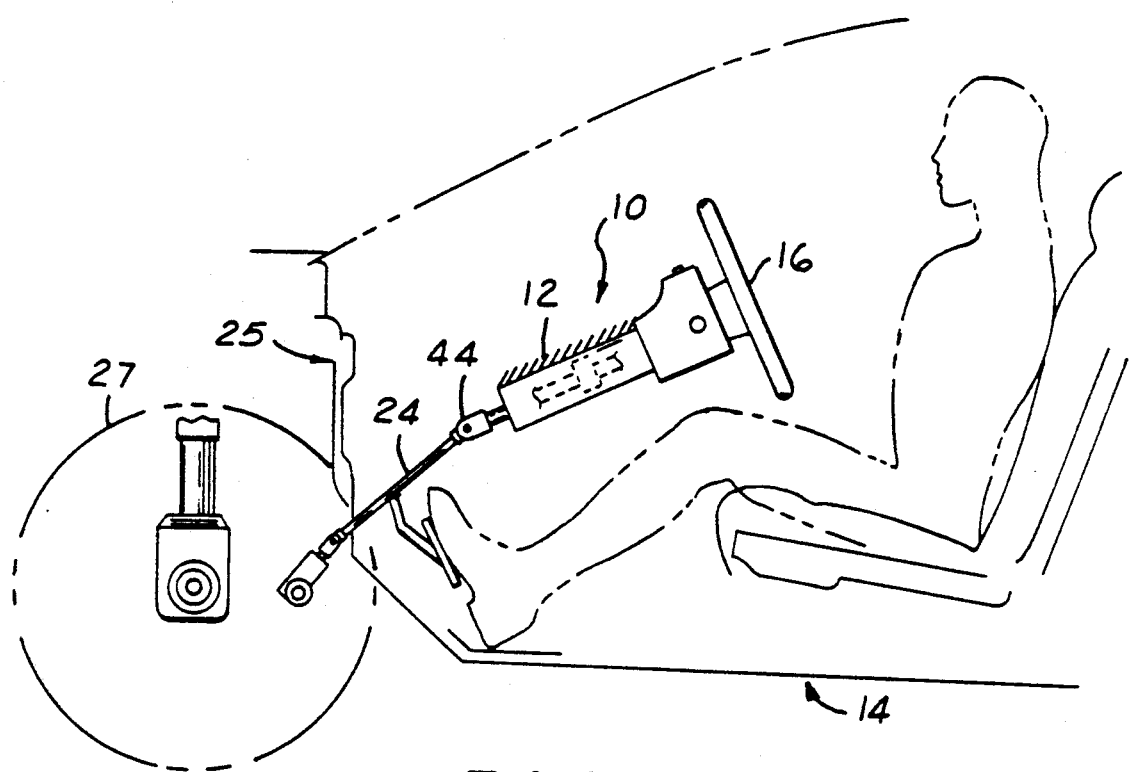
FIG. 1 is a side view of a collapsible steering column according to the present invention showing the location the column relative to a vehicle.

With reference to the drawings, the preferred embodiments of the present invention will be described. Referring to FIG. 1, a large collapse mini-steering column arrangement generally designated 10 which is collapsible to absorb the energy of an axial load imposed on the steering column is mounted under a dashboard 12 of a vehicle 14, and connected at its upper end to a steering wheel 16.

Figure 2:
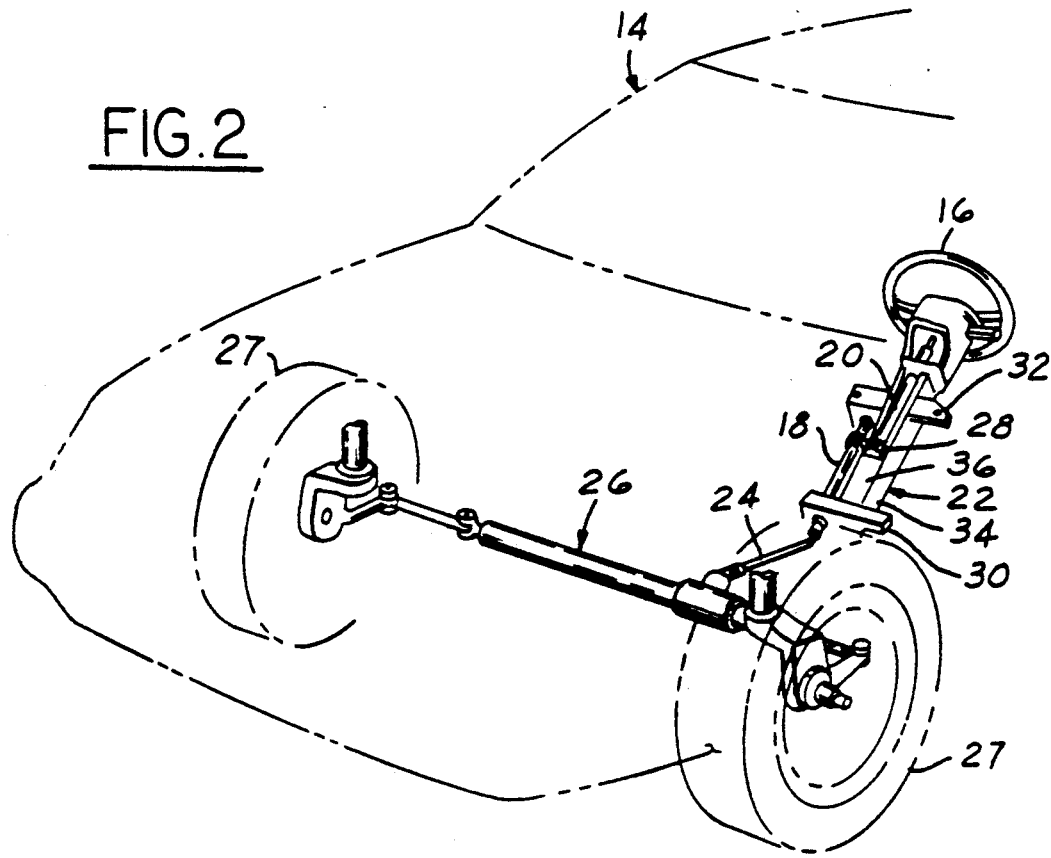
FIG. 2 is a perspective view of the steering column of the present invention showing the linkage between the column and the steering mechanism of the front wheels of vehicle.

As shown in FIG. 2, the steering column 10 comprises a pair of parallel offset shafts 18 and 20, and a housing 22. One of the shafts 18 is generally fixed with respect to the vehicle 14 while the axial load is imposed, and is connected by a conventional breakaway coupling to an intermediate shaft 24. Intermediate shaft 24 extends through dash 25 and is in turn connected to a mechanism 26 for turning the front wheels 27 of the vehicle 14. The other of the shafts 20 includes drive means 28 in rotational driving engagement with the one shaft 18 for steering the vehicle 14. The other shaft 20 is movable with respect to the one shaft 18 in response to the imposition of the axial load. The shafts 1B and 20 are held in place by conventional means such as supports 30 and 32. The housing 22 at least partially surrounds the other shaft 20. One end 34 of the housing 22 is generally fixed with respect to the one shaft 18, and the other end 36 of the housing 22 is extrudable and engageable by the drive means 28 when the drive means 28 moves.

Figures 3, 3A:
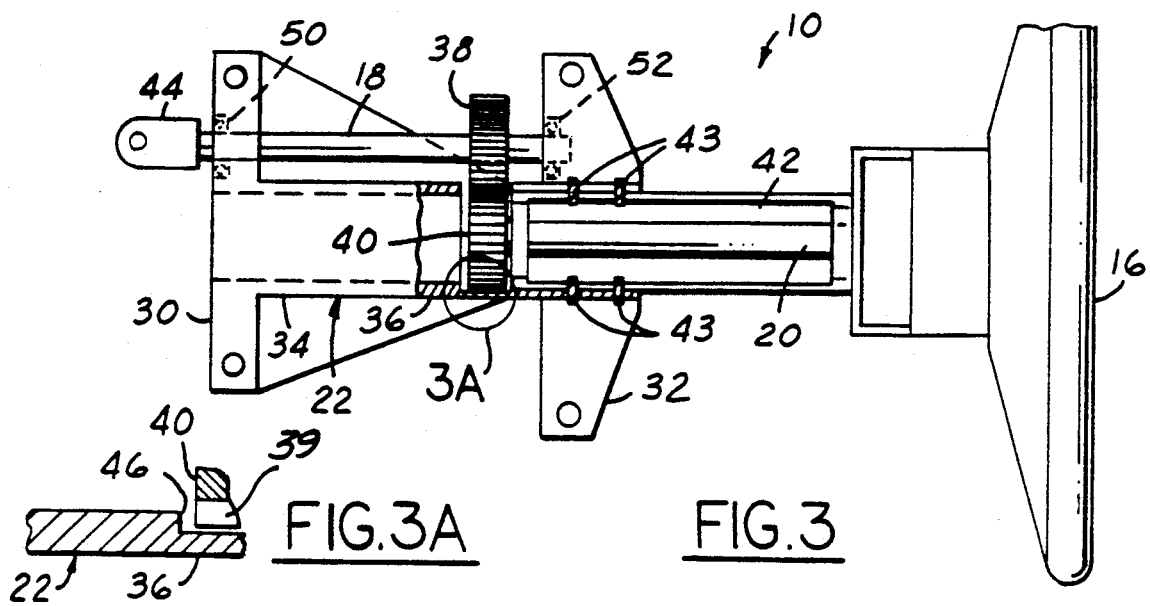
FIG. 3 is a cross-sectional plan view of the steering column o present invention before collapse.
FIG. 3A is an enlarged view of the section of FIG. 3 designated 3A.

Referring now to FIG. 3, shaft 18 includes a first gear 38 and the drive means 28 comprises a second gear 40. The gears 38 and 40 are coaxial with the shafts 18 and 20, respectively, and engage each other to transfer rotation from the other shaft 20 to the one shaft 18. The other shaft 20 is mounted within a support housing 42 which is shearably mounted to the housing 22 by plastic shear pins 43. Preferably, the first gear 38 and the second gear 40 are spur gears having straight teeth, thus allowing unimpeded slippage therebetween in the axial direction of shafts 18 and 20. However, alternatively toothed gears such as helical gears will also work, except that some initial resistance to collapse will exist. Because the shafts 18 and 20 overlap each other only to the degree necessary for the gears 38 and 40 to engage each other, the four inch overlap common in conventional telescoping steering columns is significantly shortened. Thus, the length of the steering column 10 of the present invention is likewise shortened, and the dash 25 may intrude further into the occupant compartment before contacting the lower end 44 of the one shaft 18.

FIG. 3A shows an enlarged view of the orientation of the second gear 40 and the housing 22. Interference shoulder 46 of the housing 22 provides the initial point of contact between the second gear 40 and the housing 22. While the diameter of the gears 38 and 40 and the inside diameter of the housing 22 may be varied according to design considerations, at least the teeth 48 of the second gear 40 must extend so that they will extrude through the housing 22 when the other shaft 20 begins to move. It is preferred that only the teeth 48 extend radially beyond the inside diameter of housing 22 such that at least initially the extrusion will be governed by the shearing action of the teeth 48 on the housing 22. While the housing of a typical vehicular application may have an inside diameter of about 1.2–1.5 inches, the extent to which the teeth 48 of the second gear 40 extend past the inside diameter of the housing 22 is dependent on the overall diameter chosen for the gear 40, the extrudability of the material from which the housing 22 is made, and the cross-sectional area and number of gear teeth 48. The cross-sectional area of an individual gear tooth which will extrude through the housing 22 is a function of the height and pitch angle of the tooth.

Figure 4:
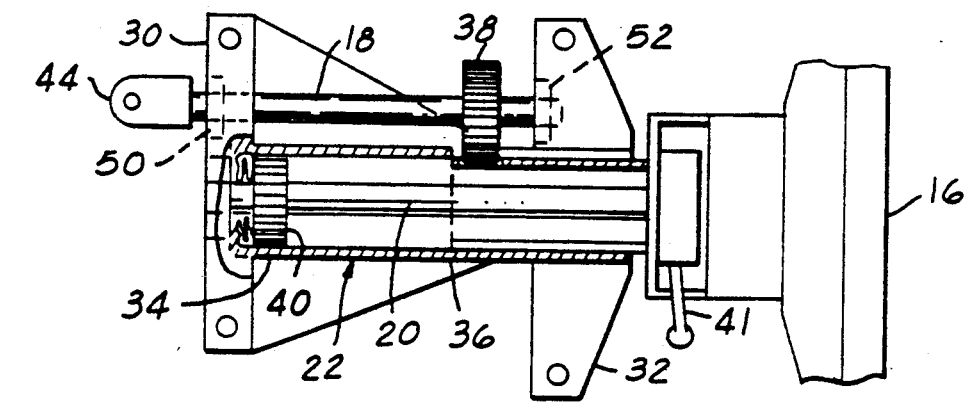
FIG. 4 is a cross-sectional plan view of the steering column of the present invention after collapse.

FIG. 4 shows the steering column 10 fully collapsed or stroked. Should the vehicle be involved in a frontal collision, inertia may carry the occupant forward into the steering wheel 16 and impose an axial load on the steering column 10. The steering column 10 collapses if this axial load exceeds a predetermined limit.

In response to the imposition of an axial load above the predetermined limit, the other shaft 20 moves axially forward relative to the one shaft 18, breaking shear pins 43. Second gear 40 thus slides out of engagement with the first gear 38 and absorbs the energy of the axial load when the teeth 48 of the second gear 40 traverse and extrude through the housing 22. The one shaft 18 is not affected while the axial load is imposed on the steering column, and therefore remains fixed to bearings 50 and 52 on the supports 30 and 32, respectively. Because the shafts 18 and 20 lie along separate longitudinal axes, they do not interfere with each other when the column 10 collapses. By being appropriately sized in a manner which will be apparent to any design engineer of ordinary skill, the housing 22 will retain its overall shape and will be deformed only at the inside diameter by the displacement of metal in front of the second gear 40. The column 10 provides a total stroke distance in the range of 100–200 millimeters. The column collapses in a square wave load pattern, i.e. resistance to the collapse is substantially constant as the shafts 18 and 20 move relative to each other.

Figure 5:
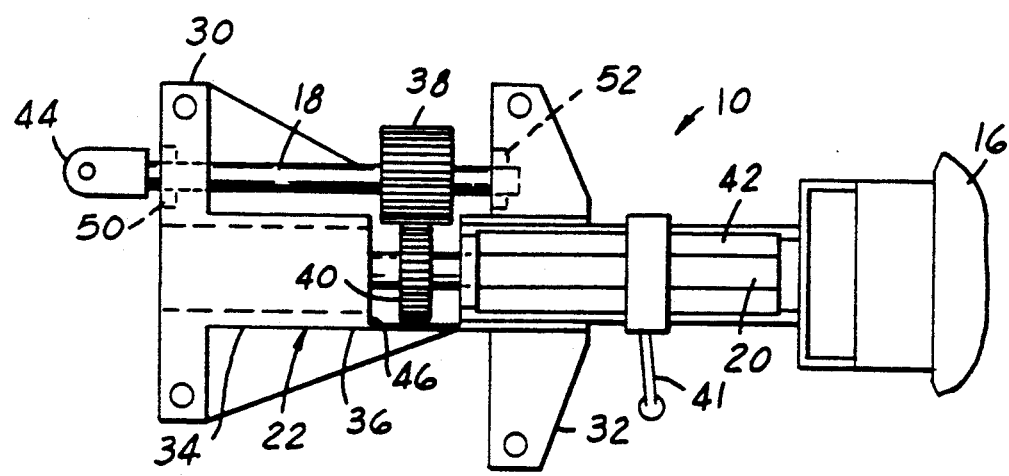
FIG. 5 is a cross-sectional plan view of an alternative embodiment of a steering column according to the present invention.

FIG. 5 shows an alternative preferred embodiment of the steering column arrangement 10 wherein the teeth 48 of the first gear 38 have a longitudinal dimension or width greater than the width of the teeth of the second gear 40. Because there is some clearance between the second gear 40 and the shoulder 46, the second gear 40 may slide on and relative to the first gear 38 a distance equal to the difference in widths of the gear teeth without abutting the shoulder 46 or extruding through the housing 22. The overall length of the steering column 10 is thus adjustable, i.e. the other shaft 20 can be moved a limited distance relative to the one shaft 18, according to driver preference. This distance is about plus or minus one inch from the middle position shown in FIG. 5. The shafts 18 and 20 are selectively secured relative to each other by a conventional manually adjustable friction lock mechanism 41 such as shown in U.S. Pat. No. 4,273,005, the teachings of which are incorporated herein by reference. The friction lock mechanism 41 offers no substantial resistance to the collapse of the column. The teeth of the second gear 40 could alternatively be wider than the teeth of first gear 38, however the range of travel of the other shaft 20 would be more limited because the wider second gear 40 would more quickly abut shoulder 46.

Figure 6:
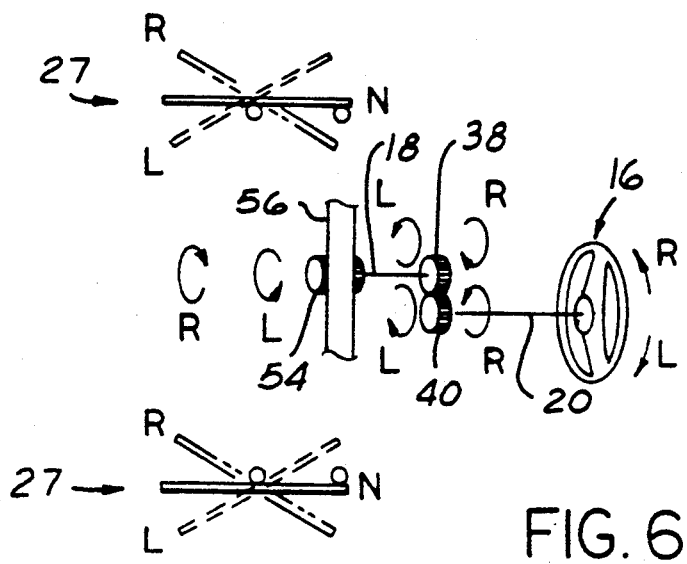
FIG. 6 schematic view of the steering column of FIG. 5.

FIG. 6 schematically shows how the front wheels 27 turn in response to rotation of the steering wheel 16. When the steering wheel 16 is turned clockwise in the direction of the arrow R, the other shaft 20 and the second gear 40 likewise turn in a clockwise direction. This imparts a counterclockwise rotation to the first gear 38, the one shaft 18, and subsequently in a lower pinion gear 54 which lies below a rack 56. When rotated in the counterclockwise direction, the lower pinion gear 54 shifts the rack 50 to the left (the downward direction in FIG. 6), and thereby moves the front wheels 27 to the position shown in phantom and designated with the letter R. When the steering wheel is turned counterclockwise in the direction of arrow L, the rotation of the relevant components is reversed. Thus, the front wheels 27 of the vehicle turn in the direction of the steering wheel 16.

Figure 7:
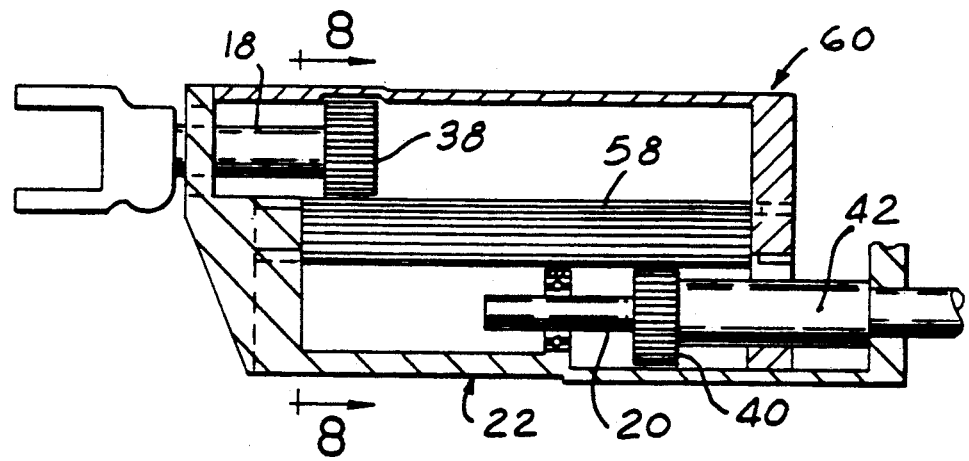
FIG. 7 is a cross-sectional view of another alternative of a steering column according to the present invention.
Figure 8:
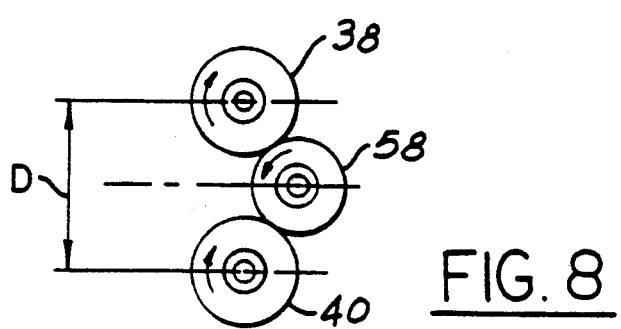
FIG. 8 is a cross-sectional view taken along line 8—8 of FIG. 7.

In those vehicles designed with the lower pinion gear 54 placed on top of the rack 56, a pinion shaft 58 is necessary to reverse the rotation of the one shaft 18 so that it rotates in the same direction as the other shaft 20, and the front wheels 27 turn in the same direction as the steering wheel 16. FIGS. 7 and 8 show the pinion shaft 58 located between and engaging first gear 38 and second gear 40. As shown schematically in FIG. 8, the pinion shaft 58 operates to rotate the one shaft 18 in the same direction as the other shaft 20. The diameters of first gear 38, second gear 40, and pinion shaft 58 can be varied, but it is preferable that the distance D between the centerlines of the first gear 38 and the second gear 40 be kept constant. This allows a common housing to enclose either a pinioned or non-pinioned steering column arrangement. For example, the rotational directional of gear 38 can be reversed without increasing the distance between the centerlines of gears 38 and 40 simply by using a smaller diameter first gear 38 and adding pinion shaft 58.

Finally, it should be noted that housing 22 is preferably made of any metal with the structural integrity to support the steering column arrangement 10, but which is soft enough to allow the extrusion therethrough of the second gear 40. Two metals which may be used are aluminum and magnesium.

It should be understood, of course, that while the forms of the invention herein shown and described constitute preferred embodiments of the invention, they are not intended to illustrate all possible forms thereof. It should also be understood that the words used are words of description rather than limitation and various changes may be made without departing from the spirit and scope of the invention disclosed.

I claim:

1. A steering column arrangement for a vehicle and collapsible to absorb the energy of an axial load imposed on the steering column arrangement, the arrangement comprising:

a pair of offset shafts, one of the shafts being generally fixed with respect to the vehicle while the axial load is imposed, and the other of the shafts including drive means in rotational driving engagement with the one shaft for steering the vehicle and being moveable with respect to the one shaft in response to the imposition of the axial load; and a housing which at least partially surrounds the other shaft, one end of the housing being generally fixed with respect to the one shaft, and the other end of the housing being engageable and extrudable by the drive means when the drive means moves, the drive means extruding through the housing whereby to absorb the energy of the axial load.

2. The steering column arrangement of claim 1 wherein the one shaft includes a first gear and the drive means comprises a second gear in rotational driving engagement with the first gear, the gears engaging each other to transfer rotation of the other shaft to the one shaft.

3. The steering column arrangement of claim 2 wherein the first gear is coaxial with the one shaft, and the second gear is coaxial with the other shaft.

4. The steering column arrangement of claim 3 wherein the one shaft and the other shaft are parallel to each other.

5. The steering column arrangement of claim 2 wherein the first gear and the second gear are spur gears.

6. The steering column arrangement of claim 5 wherein the second gear includes teeth extrudable through the housing to absorb the energy of the axial load.

7. The steering column arrangement of claim 2 wherein the teeth of one of the first or second gears are wider than the teeth of the other gear to allow the one gear to slide on and relative to the other gear a distance equal to the difference in widths of the gear teeth and thereby adjust the overall length of the steering column arrangement.

8. The steering column arrangement of claim 7 further comprising means for selectively securing the gears in position relative to each other.

9. The steering column arrangement of claim 2 further comprising means for reversing the rotation of the one shaft so that it rotates in the same direction as the other shaft.

10. The steering column arrangement of claim 9 wherein the means for reversing the rotation of the one shaft comprises a pinion shaft located between and engaging the first and second gears.

11. The steering column arrangement of claim 1 wherein the housing is made of aluminum.

12. The steering column arrangement of claim 1 wherein the housing is made of magnesium.

13. A steering column arrangement for a vehicle and collapsible to absorb the energy of an axial load imposed on the steering column arrangement, the arrangement comprising:

a pair of offset shafts, one of the shafts being generally fixed with respect to the vehicle while the axial load is imposed and including a first spur gear coaxial with the one shaft, and the other of the shafts including a second spur gear coaxial with the other shaft and in driving engagement with the first spur gear, the spur gears engaging each other to transfer rotation of the other shaft to the one shaft for steering the vehicle, the other shaft being moveable with respect to the one shaft in response to the imposition of the axial load; and an aluminum housing which at least partially surrounds the other shaft, one end of the housing being generally fixed with respect to the one shaft, and the other end of the housing being extrudable and engageable by the second spur gear when the other shaft moves, the second spur gear extruding through the housing whereby to absorb the energy of the axial load.

14. A steering column arrangement for a vehicle and collapsible to absorb the energy of an axial load imposed on the steering column arrangement, the arrangement comprising:

a pair of offset shafts, one of the shafts being generally fixed with respect to the vehicle while the axial load is imposed, and the other of the shafts including drive means in driving engagement with the one shaft for steering the vehicle and being axially moveable with respect to the one shaft in response to the imposition of the axial load; and a housing which at least partially surrounds the other shaft, one end of the housing being generally fixed with respect to the one shaft, and the other end of the housing being engageable and extrudable by the drive means when the drive means moves axially forward relative to the one shaft whereby the energy of the axial load is absorbed as the drive means traverses and extrudes through the housing.

* * * * *

UNITED STATES PATENT AND TRADEMARK OFFICE
CERTIFICATE OF CORRECTION

PATENT NO. : 5,070,741

DATED : December 10, 1991

INVENTOR(S) : Paul R. Ervin

It is certified that error appears in the above-identified patent and that said Letters Patent is hereby corrected as shown below:

In the Abstract, line 4, after "vehicle", delete "and includes a first gear, a second gear and the other shaft includes in rotational driving engagement with the first gear on" and substitute --, and the other shaft includes drive means in rotational driving engagement with--.

Column 2, line 49, after "location" insert --of--.

Column 2, line 54, before "vehicle" insert --the--.

Column 2, line 56, after "column" delete "o" and substitute --of the--.

Column 2, line 64, after "6" insert --is a--.

Column 2, line 66, after "alternative" insert --embodiment--.

Column 3, line 26, delete "1B" and substitute --18--.

Signed and Sealed this

Twentieth Day of April, 1993

Attest:

MICHAEL K. KIRK

Attesting Officer

Acting Commissioner of Patents and Trademarks